UNITED STATES PATENT OFFICE.

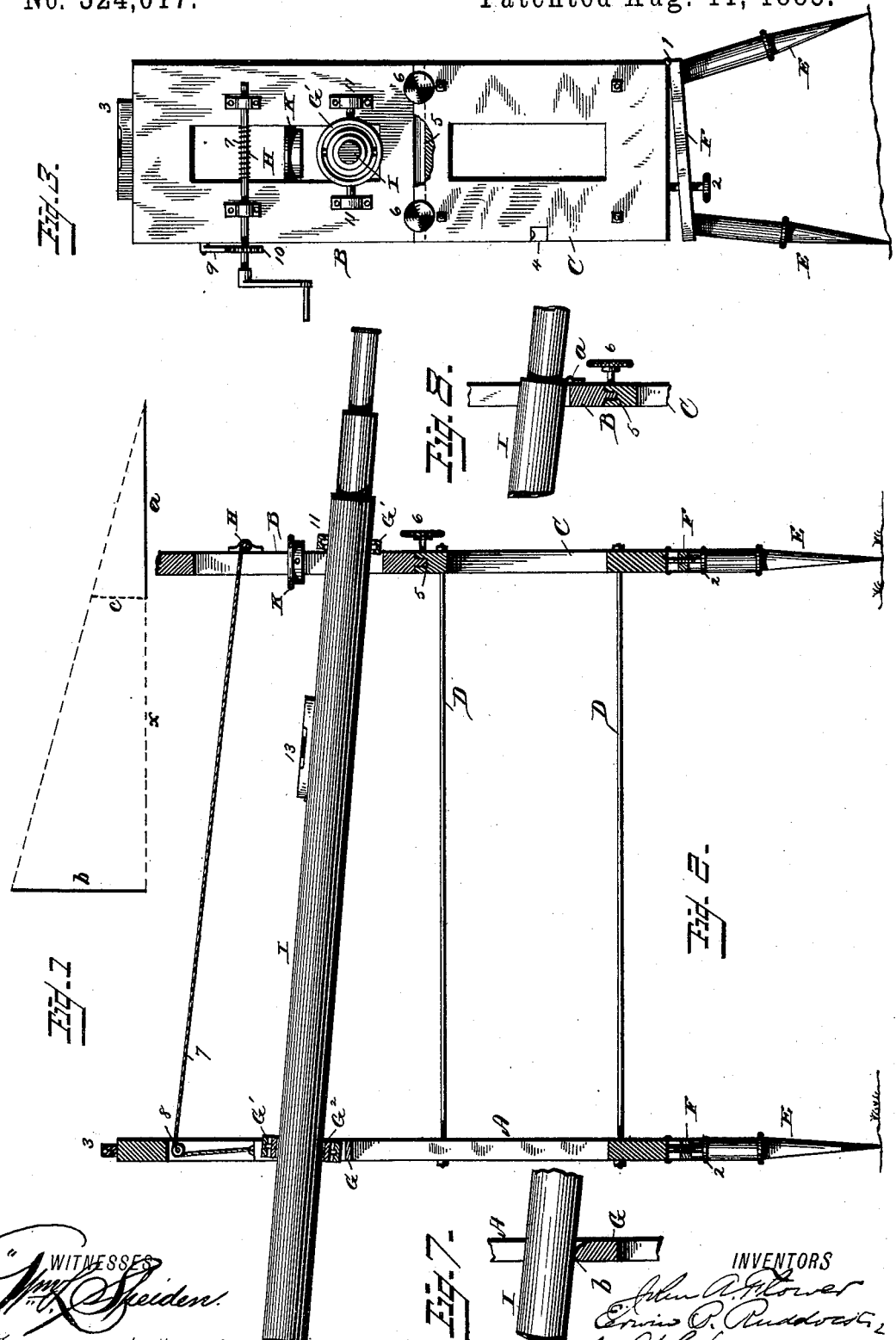

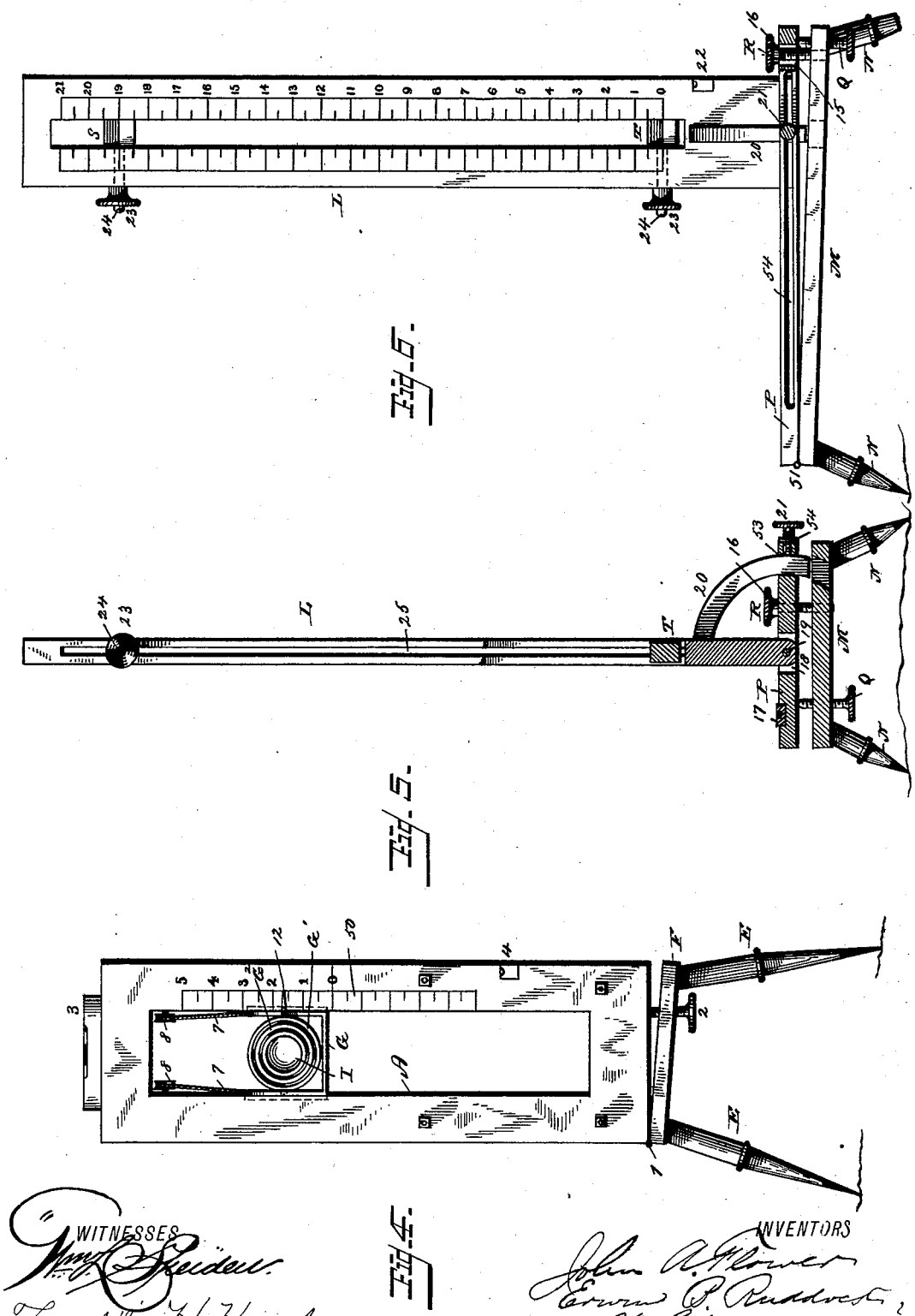

JOHN A. FLOWER AND ERWIN B. RUDDOCK, OF CAMPTON, ILLINOIS.

AIR-LINE-SURVEYING INSTRUMENT.

SPECIFICATION forming part of Letters Patent No. 324,017, dated August 11, 1885.

Application filed March 28, 1885. (No model.)

*To all whom it may concern:*

Be it known that we, JOHN A. FLOWER and ERWIN B. RUDDOCK, citizens of the United States, residing at Campton, in the county of Kane and State of Illinois, have invented certain new and useful Improvements in Air-Line-Surveying Instruments; and we do hereby declare the following to be a full, clear, and exact description of the invention, such as will enable others skilled in the art to which it appertains to make and use the same.

This invention relates to instruments for measuring distances by the application of the principle that the corresponding sides of similar or equiangular triangles are proportional.

It consists in a telescope or similar appliance supported in a frame, so as to turn on a transverse axis, in combination with an upright graduated scale fixed on said frame at a determined distance from the said axis, and a pointer connected with the telescope, so as to move over the scale as the same is turned. This telescopic instrument is used in connection with a staff, which is placed at the point whose distance is to be ascertained.

The operation will be understood from the diagram, Figure 1, in the accompanying drawings.

The solid line $a$ represents the fixed distance from the axis on which the telescope turns to the base of the upright scale, the solid line $b$ the known length of the staff, or a determined portion of the same, the dotted line $c$ the distance measured off on the scale by the pointer when the telescope is turned from sighting along the line $a$ to the base or lower point on the staff into a position to point to the top or higher point on the staff. The distance $x$ from the axis on which the telescope turns to the base of or lower point on the staff will then be found according to the proportion $c : b :: a : x$. The distance $x$ is of course the whole base of the larger triangle, and includes the solid line $a$, as well as the dotted line forming a continuation thereof.

The triangles are shown as right angled at the staff; but this is not material, since the rule that the corresponding sides of similar triangles are proportional is true of triangles having all the angles oblique.

Heretofore instruments have been used to measure distances by means of a telescope turning on a transverse axis at one station and a staff of known length at the other; but in these instruments the graduated limb or scale expressed in degrees, minutes, and seconds the arc through which the telescope was turned, and a long calculation or a reference to a table was necessary to ascertain the distance, whereas in the present invention the scale indicates a certain linear distance whose proportion to the known height of the staff is that of the known distance to the distance sought.

The present invention also comprises certain special constructions, combination, and arrangement of parts in the staff and telescopic instruments, as hereinafter set forth.

The following is a description of the best mode to us known of applying the principle of the invention, reference being had to Figs. 2 to 6 of the accompanying drawings, which form a part of this specification.

Fig. 1 is a diagram illustrating the general principle on which the instruments operate, as already explained. Fig. 2 is a sectional elevation of the telescopic instrument, the section being a longitudinal one. Figs. 3 and 4 are views in elevation at opposite ends of the same instrument. Fig. 5 is a sectional elevation of the staff in a plane parallel to that of Fig. 1, and Fig. 6 is a front elevation of the same. Figs. 7 and 8 show a modification.

The frame of the telescopic instrument consists of the front upright, A, the rear upright in two parts, B and C, respectively, the braces or connections D, permanently connecting the front upright, A, with the under part, C, of the rear upright, the legs E, and the cross-pieces F, attached each to a pair of legs and adjustably connected with the front and rear uprights, respectively. The legs are or may be extensible and folding, as customary in surveying-instruments. Each cross-piece F is hinged at 1 to the bottom of the upright, and is also provided with a set-screw, 2, tapped through the cross-piece and bearing at the end against the bottom of the upright. By means of these screws the uprights can be adjusted. The extensibility of the legs also assists in adjusting the instrument.

Spirit-levels 3 on top of the uprights, and spirit-levels 4 set in the edges thereof at right angles to the former, enable a perfectly vertical position to be given to the uprights.

The upper part, B, of the rear upright is connected by sliding tongue-and-groove connection 5 with the under part, C, and is held in the place to which it is adjusted by the set-screws 6, or by one of them.

The front upright, A, is slotted, and in the slot is the block G, sliding in grooves in the side walls of the upright, as indicated in dotted lines, and supported by means of cords 7, which run over pulleys 8, and thence to the cross-shaft H, on which they are wound. The shaft H is journaled in bearings in the rear upright, and is prevented by pawl 9 and ratchet 10 from turning and allowing the block G to fall.

The telescope or sighting appliance I passes through the slot in the front upright and rests at the front end on the universal joint or swivel-rings $G'$ $G^2$. (Shown supported on the block G.) It also passes through an opening or slot in the upper part, B, of the rear upright, and is pivoted to said part at 11 in swivel-rings $G'$ $G^2$, the horizontal pivots being to each side of the telescope along the center of sight—or, in other words, in the same plane as the line along which is sighted the object whose distance is sought.

On the front of the upright A is a scale, 50, graduated to express linear dimensions. The block G serves as or is provided with a pointer. It is preferred to have the pointer in the zero of the scale when the line of sight is horizontal. To fix this point, the sight-tube I is provided with a spirit-level, 13, supported thereon lengthwise of the same. It is also preferred to have the line of sight pass through the transverse axis on which the telescope turns.

The instrument is provided with a compass, K, to indicate directions.

The stand for the staff L consists of the base M, provided with legs N, which are or may be folding and extensible, and the top P, hinged to the base M at 51, and at the other end adjustably connected therewith by set-screws Q R, the one, Q, being tapped through the base and bearing at the point against the under side of the top P, so as to uphold the same, and the other, R, fastened in the base M, projecting through a slot, 15, in the top P, and provided with a nut, 16, for forcing down the said top. By means of these screws the top is adjusted until the spirit-level 17 indicates that it is horizontal. The base of the staff L fits in the slot 18 and slides in the same and also on the fixed rod 19. It is held or steadied in an upright position by means of the curved arm 20, passing through the slot 53, and the set-screw 21, passing through slot 54, which arm and set-screw also prevent it from being moved lengthwise of the rod 19. By means of a spirit-level, 22, in connection with the spirit-level 17, with which it makes a right angle, the staff L can be brought to a perfectly vertical position.

The targets S T are adjustable on the staff L, and are retained in the position to which they may be adjusted by set-nuts 23 on the end of the screws 24, which are fast in said targets and project through the slot 25 in the staff. The face of the staff is graduated as shown.

The operation will be readily understood. The operator at the distant station sets up the staff L in a vertical position. The operator with the telescope adjusts his instrument likewise, and gets his line of sight in the same vertical plane as the middle line of the staff. This can be done, if the bases of the two instruments as set up are not quite square with each other, by turning the telescope horizontally, which can be done through the adjustment of the part B in the lower part, C, of the rear upright, so as to swing the rear end of the telescope L to one side; or it can be done by moving the staff L right or left on the top N, or by both means. The telescope is next brought to a horizontal position, and the lower target, T, is adjusted by the distant operator until it is in the line of sight. Then he places the upper target at the proper distance above it and secures it there. The operator with the telescope then turns the latter upward, by winding up the cords 7 on the shaft H, until the center of the upper target, S, is in the line of sight. On ascertaining the distance through which the block G has been lifted, by reference to the scale 50 on the upright A the distance to the staff is obtained by calculation according to the proportion before given, viz.: $c : b :: a : x$.

It is evident that modifications can be made in details without departing from the spirit of the invention, and that parts of the invention may be used separately.

Instead of the swivel-rings $G'$ $G^2$ being used the telescope may be hinged at the points $a$ to the rear upright, as shown in Fig. 8, and the forward part of it rests upon the block G, as shown in Fig. 7, the top edge, $b$, of the block in such event serving as the pointer. Under such construction the line of sight will be taken along the bottom of the telescope, but the principle is the same as in the other way illustrated of supporting the telescope.

Having now explained the invention and the manner in which the same is or may be carried into effect, what we claim, and desire to secure by Letters Patent, is—

1. The combination, with the telescopic instrument having a telescope adjustable in vertical and transverse horizontal planes, of a pointer or block connected with said telescope, an upright scale for said block or pointer to move over, and a frame carrying a staff adjustable sidewise and having adjustable targets thereon, substantially as described.

2. The combination, with the frame, of the telescope or sighting appliance pivoted thereto at one end and the cords and pulleys for raising and lowering the opposite end, substantially as described.

3. The combination, with the front upright and the telescope having its front end supported in said upright, of the rear upright having an adjustable upper part to which the telescope is pivoted, substantially as described.

4. The combination, with the telescope and its supports, of the legs connected by cross-pieces at the top, each cross-piece being adjustably connected with the said supports, substantially as described.

5. The combination, with the telescopic instrument having a telescope movable about a transverse axis, a scale placed at a given distance from said axis, and a pointer or block connected with the telescope and movable with reference to the scale, of the staff having the two adjustable targets, substantially as described.

6. The staff provided with adjustable targets, in combination with an adjustable stand for said staff, substantially as described.

7. The staff provided with a spirit-level, in combination with a stand, also provided with a level, and means, such as set-screws, for adjusting the staff to a vertical position with the aid of said levels, substantially as described.

8. The combination, with the stand, of the staff supported in an upright position on said stand in ways thereof, so that it can be moved sidewise, substantially as described.

In testimony whereof we affix our signatures in presence of two witnesses.

JOHN A. FLOWER.
ERWIN B. RUDDOCK.

Witnesses:
   VINCENT S. LOVELL,
   JAMES BARRETT.